United States Patent [19]

Stewart, III et al.

[11] Patent Number: 4,638,621
[45] Date of Patent: Jan. 27, 1987

[54] METHOD AND SYSTEM FOR PROCESSING AQUATIC PLANTS

[75] Inventors: E. Allen Stewart, III, Cocoa; Evan L. Keesling, Lake Helen, both of Fla.

[73] Assignee: Amasek, Inc., Cocoa, Fla.

[21] Appl. No.: 703,144

[22] Filed: Feb. 19, 1985

Related U.S. Application Data

[63] Continuation-in-part of Ser. No. 533,012, Sep. 16, 1983, Pat. No. 4,520,616.

[51] Int. Cl.⁴ ............................................. A01D 44/00
[52] U.S. Cl. ................................................ 56/9; 56/8
[58] Field of Search ................................. 56/8, 9, 12.2

[56] References Cited

U.S. PATENT DOCUMENTS

| | | | |
|---|---|---|---|
| 1,795,003 | 3/1931 | Allen | 56/9 |
| 2,651,269 | 9/1953 | French | 56/12.2 |
| 3,468,106 | 9/1969 | Myers et al. | 56/9 |
| 3,546,858 | 12/1970 | Chaplin | 56/9 |
| 3,611,680 | 10/1971 | Hendrickson | 56/9 |
| 3,866,396 | 2/1975 | Meyer | 56/9 |
| 4,109,448 | 8/1978 | Kline | 56/1 |
| 4,202,155 | 5/1980 | Stewart | 56/9 |
| 4,209,918 | 7/1980 | Klein | 56/12.2 |
| 4,259,828 | 4/1981 | Pace | 56/9 |
| 4,509,273 | 4/1985 | Roisien | 56/12.2 |
| 4,520,616 | 6/1985 | Stewart et al. | 56/9 |

Primary Examiner—Paul J. Hirsch
Attorney, Agent, or Firm—Duckworth, Allen, Dyer

[57] ABSTRACT

A system for harvesting and processing aquatic plants growing on the surface of a body of water includes a shore mounted harvesting apparatus which gathers the plants from the surface of the water and conveys them to a first chopper assembly which rips and shreds the plants to a first manageable size. The harvester assembly includes a first rotating drum positioned in the water which forces the plants upward and into engagement with a second rotating drum having a plurality of spiral wound vanes which engage the material and forces it along the passageway into further engagement with a third rotating drum which cooperates with a cutting bar to serrate and shred the material. The shredded material is thereafter transferred to a chopping assembly which comminutes the aquatic plants into very small pieces. The comminuted plants are first pressed and then transported to a mixer dryer assembly which includes a large vat for receiving the comminuted plants and a plurality of stirring arms arranged in an interrupted feed screw pattern. The stirring arms continuously stirs the material causing it to move from one end of the vat towards another from where it can be selectively recirculated externally of the vat until sufficient drying is achieved. The mixer dryer apparatus has provision for being temperature controlled both by a water jacket arund the vat and by passing heated air over the top of the stirred mixture. If desried, the plants may be mixed with other material to form an animal feed product.

29 Claims, 12 Drawing Figures

METHOD AND SYSTEM FOR PROCESSING AQUATIC PLANTS

This application is a continuation in part of an application filed Sept. 16, 1983, Ser. No. 533,012 now U.S. Pat. No. 4,520,616 by the same inventive identity.

BACKGROUND OF THE INVENTION

The aquatic plant Eichhornia Crassipes Mart Solmes, commonly referred to as water hyacinths, is a vascular plant which grows on the surface of the water with root structures generally extending only a few inches below the surface. This plant grows in densities ranging between 40 and 150 wet tons per acre, in fresh water bodies ranging from small canals and lakes to very large lakes and rivers. Water hyacinths can cause considerable ecological and economic harm in certain areas of the United States, particularly in the warmer regions, such as Florida and other southeastern states.

Numerous systems and methods have been developed in the prior art for harvesting aquatic plants. Applicant's application Ser. No. 533,012 now U.S. Pat. No. 4,520,616 disclosed a number of prior art patents dealing with the harvesting and processing of water hyacinths. In that application, Applicant disclosed an improved system which can be utilized to condition and remove the plants from a body of water for further processing. In particular, Applicant disclosed generally an apparatus for collecting and processing the aquatic plants by chopping into a uniform size to permit easy removal by a pumping mechanism.

SUMMARY OF THE INVENTION

The present invention contemplates both a system and method for removing and processing aquatic plants, and particularly water hyacinths, to provide a useful end product.

The method of the present invention includes the provision of a harvester chopper for collecting the plants and chopping them to a first manageable size, a press to reduce water content and a mixer dryer associated with a harvester chopper for reducing the chopped plants to a dried end product. The harvester chopper includes a shore mounted apparatus having a first drum with longitudinal ribs operating just below the surface of a water reservoir and rotating in such a manner as to direct the aquatic plants upward and over the top of the rotating drum. A second drum located above the surface of the water has a plurality of spiral wrapped vanes which engage and remove the plants collected by the first drum and direct the plants along a passageway into a first chopping and cutting apparatus. The chopping and cutting apparatus comprise a rotating drum having a plurality of tooth like projections which grasp the plants from the second drum and push them pass a cutter bar which rips and shreds the plants into small sections. The shredded plants are thereafter conveyed to a chopper assembly which comminutes the plants into relatively small pieces. The comminuted plants are thereafter pumped to the press and conveyed to a mixer dryer apparatus which air dries the chopped plants by continuous mixing using large paddles while heating the vat and blowing heated air over the top of the constantly mixed plants. Preferably the dried plants are thereafter removed from the mixer/dryer apparatus and utilized as an animal feed supplement.

DETAILED DESCRIPTION OF THE INVENTION

Figure 1:
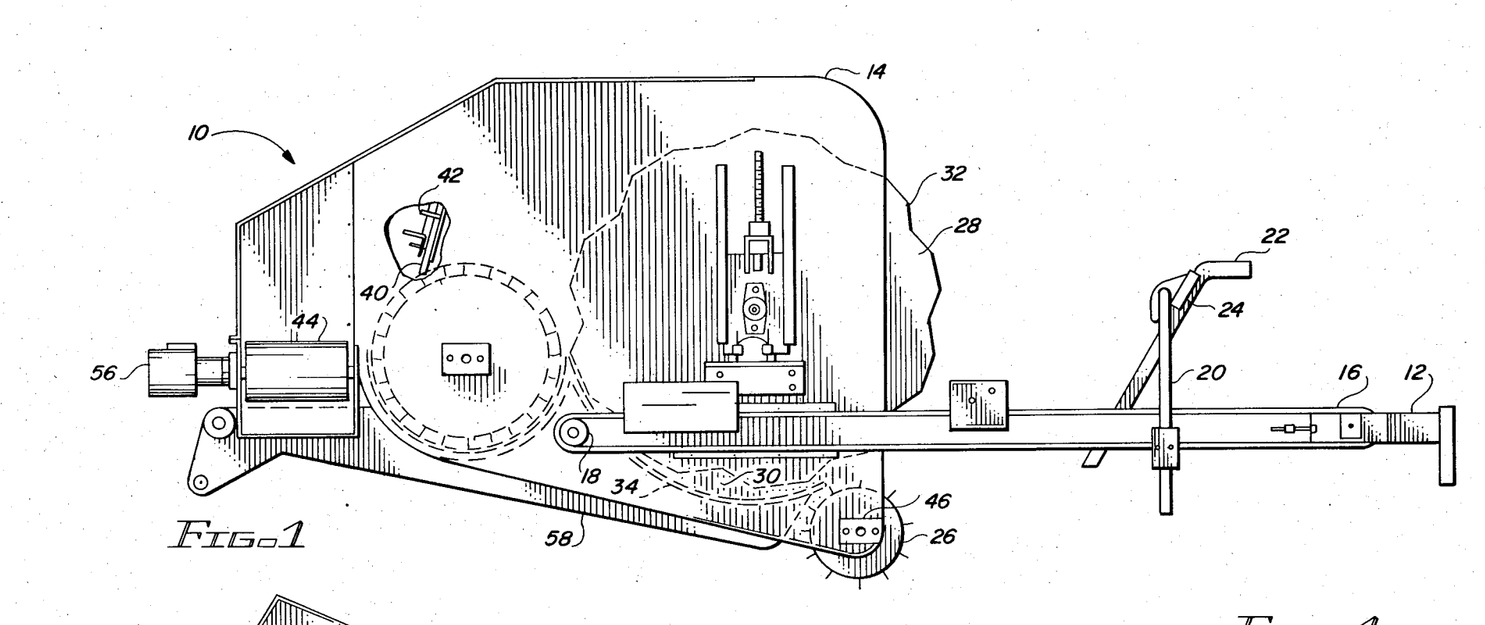
FIG. 1 is a side view of a harvester and prechopper assembly in accordance with the present invention.

Referring now to FIG. 1, there is shown a side view of a harvester and pre-chopper assembly 10 in accordance with the present invention. The assembly 10 includes a boom 12 attached to a side plate 14 of the apparatus and extending outwardly thereof. The boom 12 is designed to extend out over a water reservoir or pond in which there are located aquatic plants of the type to be harvested. Mounted on the boom 12 is a chain drive assembly 16 comprising a reciprocating chain driven by a sprocket 18. The sprocket 18 is in turn driven by a hydraulic motor (not shown) of a type well known in the art. Attached to the chain drive unit 16 is a connector pin 20. Connector pin 20 serves a dual function. A first function is to provide an attachment point for a floating boom not shown here but described in detail in Applicant's co-pending application Ser. No. 533,012, now U.S. Pat. No. 4,520,616 the boom being adapted to pull and guide the aquatic plants into the apparatus 10. The second function of the connector pin 20 is to serve as a connecting point for a hitch feed finger assembly 22 which is adapted to pull the aquatic plants along the surface of the water into the apparatus 10. The hitch feed finger assembly 22, although shown as only a single unit in FIG. 1, actually comprises a plurality of units extending across the width of the front area of the apparatus 10. Each of the hitch feed finger assemblies is pivotally attached to the connector pin 20 by means of a rod element (not shown) passing from the connector pin 20 on one side of the apparatus 10 to a second connector pin identical to the connector pin 20 and also attached to another chain drive assembly operating in parallel to assembly 16 on the opposite side of apparatus 10. The hitch feed finger assembly 22 also includes a stop pad 24 which is attached to the pivot rod in such a manner as to permit the finger assembly 22 to move to a substantially horizontal position by pivoting clockwise but restricts the pivoting action in the counter clockwise position to approximately that angle illustrated in FIG. 1.

To better understand the operation of the hitch feed finger assembly 22, it might be noted that the chain driven 16 is adapted to operate in a reciprocating fashion, i.e., the drive forces the connector pin to move inward towards the apparatus 10 for a pre-determined distance and then reverses its motion of travel to push the connector pin 20 outward and away from the apparatus 10. In performing this function, the hitch feed finger assembly 22 engages at its lower end the aquatic plants floating on the surface of the water and drags them in toward the apparatus 10. When the connector pin 20 is forced outward away from the apparatus 10, the finger assembly 22 is allowed to pivot and float across the tops of the aquatic plants in such a manner as to prevent the plants from moving outward away from the apparatus 10.

As the aquatic plants are pulled inward by each of the hitch feed finger assemblies 22 towards the apparatus 10, the plants are first engaged by a first rotating drum 26, sometimes referred to as a kicker drum, which rotates in a counter clockwise direction as viewed in FIG. 1 so as to pull the plants upward from the lower portion of the water towards the top of the drum 26. In order to facilitate this action, the drum 26 includes a plurality of longitudinal rib like members which engage the plants and pull them up over the drum. During this operation, the top surface of the drum 26 is typically one to three inches below the surface of the water.

Figures 2, 11, 12:
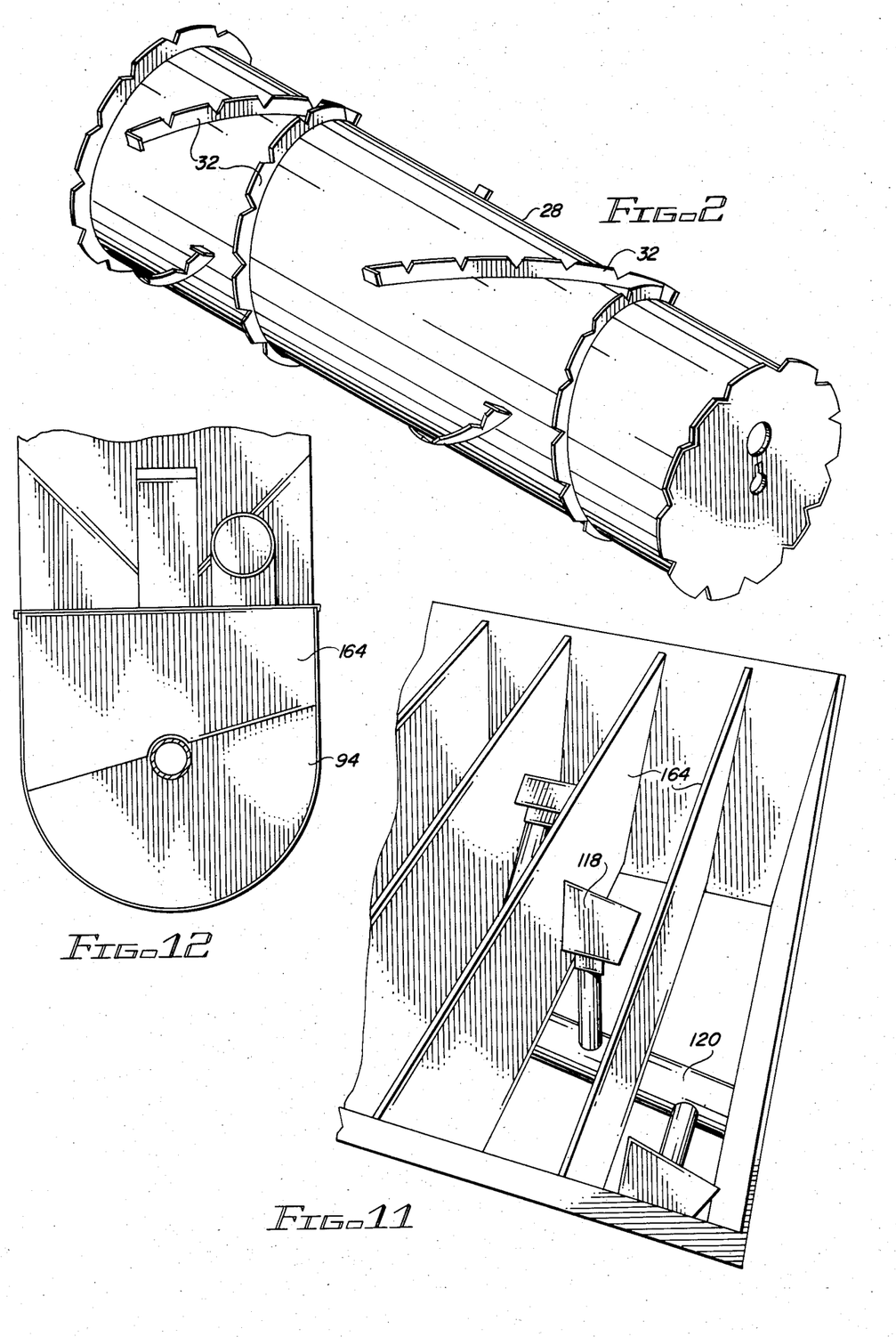
FIG. 2 is a perspective view of a feed drum used in the apparatus of FIG. 1.
FIG. 11 is a top perspective view of a portion of the apparatus of FIG. 6 illustrating the arrangement of mixer blades and dividers.
FIG. 12 is an end view of the assembly of FIG. 6 illustrating the divider formation.

As the aquatic plants are pulled over the top of the drum 26, a second feed drum 28 wipes the plants off the drum 26 and directs them into a passageway 30. The passageway 30 is defined by a surface of the drum 28 and a curved plate 32 which extends along an arc of the drum 28 internally of the apparatus 10. The drum 28 is approximately four times the diameter of the kicker drum 26 and its outer surface has attached thereto a plurality of spiral wound projections 34. The feed drum 28 acts as a wiper and distributor to maintain a uniform flow of aquatic plants into the passageway 30. The spiral wound projections 34 are preferably serated to assist in providing the uniform flow rate and in addition, prevent the attachment of plants to the feed drum 28. Referring briefly to FIG. 2, there is shown a more detailed view of the feed drum 28 illustrating the shape and configuration of the serated projections 34 which effect the uniform flow rate into the passageway 30.

Referring again to FIG. 1, the aquatic plants are pushed along passageway 30 sliding along the curved plate 32 until they reach the point 36. At the point 36, a third counter clockwise rotating drum 38, sometimes to referred to as a hog drum, grasps the plants that are exiting the passageway 30 and causes them to move under a cutter bar 40 at which point the plants are cut, ripped and shredded into sections that are generally no larger than about five inches in length. The cutter bar 40 has an adjustment mechanism 42 allowing it to be positioned at an appropriate distance from the surface of the hog drum 38 in order to control the size of the plants exiting beyond the cutter bar 40. The shredded plants exiting from under the cutter bar 40 are deposited on a cross feed conveyor 44 by which they are conveyed to a first collection area.

Figure 3:
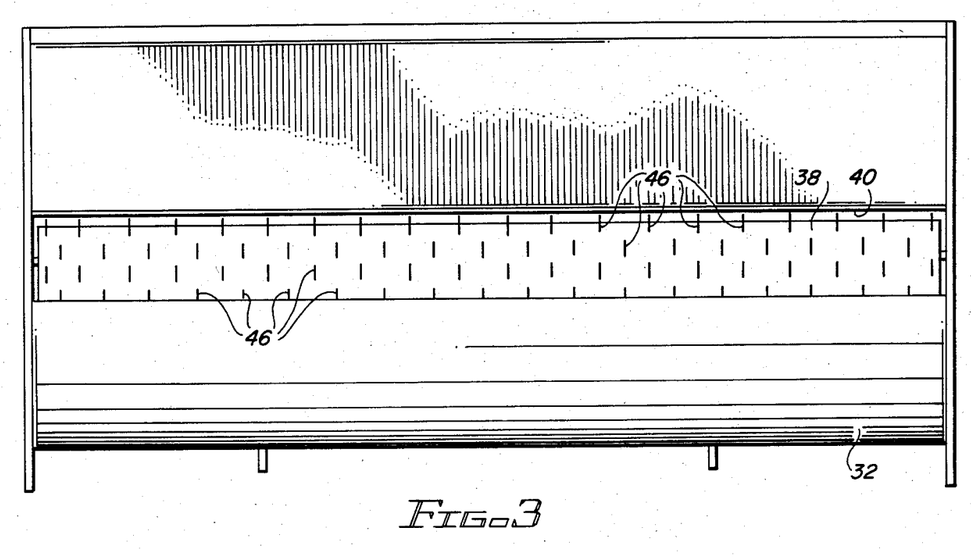
FIG. 3 is a perspective view of a hog drum and cutter bar arrangement of FIG. 1.

A better view of the hog drum 38 can be had by reference to FIG. 3 in which there is shown a view of the drum 38 and cutter bar 40 as viewed from the location of the feed drum 28. The curved plate 32 which forms one side of the passageway 30 is also visible in FIG. 3. It should be noted that the teeth 46 are arranged on the outside surface of the cutter bar in a spiraling and staggered relationship. The purpose of this relationship is to provide a pattern such that only one tooth 46 is in direct alignment with the cutter bar 40 at any instant in time to thereby minimize the load and/or power requirements necessary to drive the plants under the cutter bar 40.

Referring again to FIG. 1, each of the drums 26, 28, and 38 are individually driven by hydraulic motors located on the opposite side of the apparatus 10 from the view shown in FIG. 1. However, in FIG. 1 there can be seen the bearing support members 46, 48, and 50 which support respectively the drum 26, 28 and 38. Each of the bearing support members are attached by means well known in the art to the side plate 14. However, in the case of the bearing support member 48, member 48 is attached to a plate 52 which is slideably fastened to the side of the member 14. An adjusting mechanism 54 indicated as a screw type adjusting mechanism is attached to the plate 14 and the plate member 52 to allow the axis of rotation of the drum 28 to be shifted sufficiently to control the spacing between the surface of the drum 28 and the curved plate 32. The cross feed conveyor 44 is also driven by a hydraulic motor 56 attached to one of the axles (not shown) around which a conveyor belt 45 is stretched. The apparatus 10 also includes a frame support member 58 forming a chassis and general support member for attaching all of the components thus far described.

Figure 4:
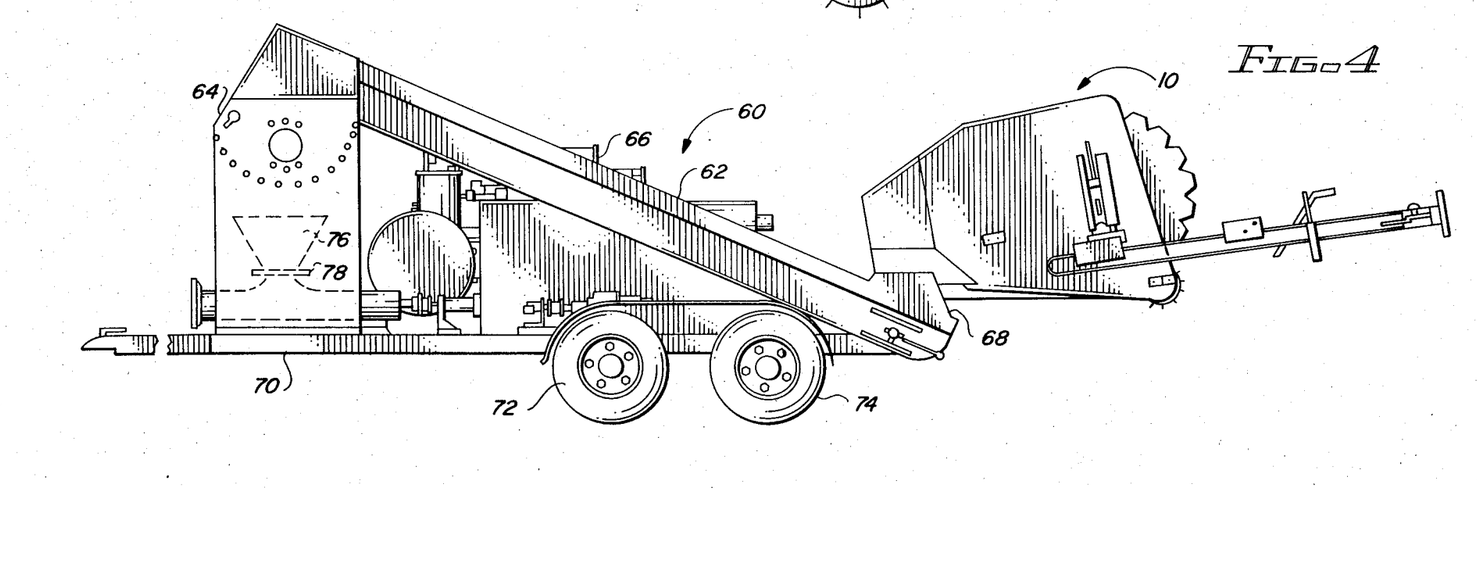
FIG. 4 is a side view of the assembly of FIG. 1 connected to a chopper assembly of the present invention.

Referring now to FIG. 4, there is shown a side planar view of an additional portion of the harvester chopper apparatus in accordance with the present invention. In this figure, the apparatus 10 is shown connected to a further apparatus 60 including an elevating conveyor 62 and a comminuting chopper assembly 64. The apparatus 60 also includes a prime mover 66 of a type well known in the art for providing power to both the apparatus 10 and the apparatus 60.

The feed system apparatus 10 is attached to the apparatus 60 at the end or output side of the cross feed conveyor 44. The elevating conveyor 62 includes a storage area 68 for receiving the shredded plants provided by the feed system apparatus 10. The conveyor 62 is a continuous belt drive conveyor of a type well known in the art and serves to lift the shredded plants from the output side of the feed system 10 to an input area over the chopper assembly 64. The shredded plants fall off the end of the conveyor 62 and into a hopper portion of the chopper assembly 64. Preferably, the chopper assembly 64 is a standard helical blade chopper assembly manufactured by the Sperry-New Holland Corporation of Holland, Mich. This type of chopper assembly includes a plurality of rotating cutting bars which cut the material against an outer shell in which there are formed a plurality of small holes. The holes cause the assembly to work somewhat like a shredder and maintain the plant material inside the chopper until it becomes small enough to exit through these holes. In this manner, the size of the comminuted plants can be controlled.

In a preferred embodiment of the invention, the harvester and chopper are mounted on a frame 70 which includes first and second wheels 72 and 74 allowing the entire assembly of apparatus 10 and apparatus 60 to be towed as a trailer package.

After the material has been chopped and fallen through the holes in the outer shell of the chopper assembly 64, the material drops into a hopper opening 76 leading into an interruped screw type conveyor or progressive cavity screw pump 78 which allows the material to be moved to a further processing station.

Figure 5:
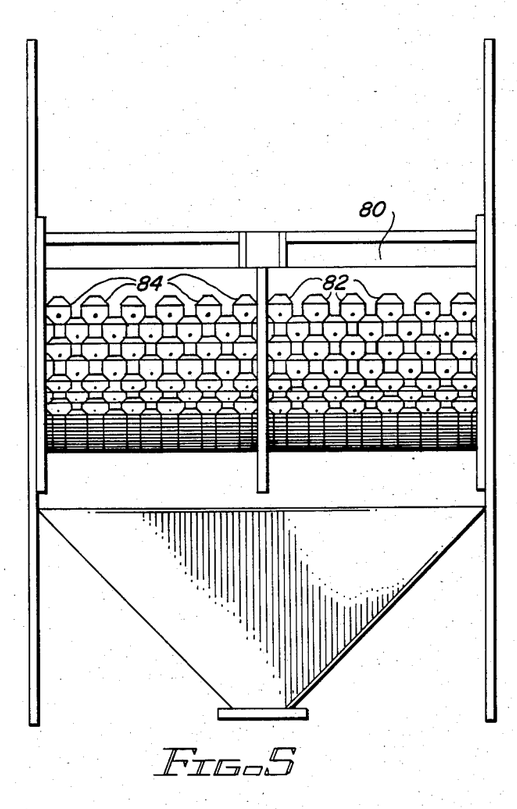
FIG. 5 is a perspective view of a recut screen assembly used with the assembly of FIG. 4.

Referring now to FIG. 5, there is shown another view of the outer shell of the chopper assembly 64. In this view it can be seen that the shell is in the form of a recut screen 80 having a plurality of hexagonal openings 82 formed therein. Each of the openings 82 includes a recut blade 84 which protrudes into the chopper assembly 64. Preferably, the recut blades 84 extend at least 1/16th inch or more into the chopper assembly cavity. By protruding into the cavity, the recut blades 84 reduce the friction on the recut screen and also assist in retaining the plants inside the chopper assembly until they become reduced to a desired size by the shearing and chopping process. Each of the recut blades is held in place by socket head cap screws which provides for easy removal and replacement. The holes 82 are shaped to stabilize the position of each of the recut blades 84 and also to control the size of the material exiting therethrough. The cutting action occurs because the helical blade inside the chopper assembly continuously drives and turns the material past the recut blades. As the material falls through the openings 82 it enters the hopper 76 which leads into the progressive cavity screw pump 78. It should be noted also that the openings 82 are arranged in staggered rows. The arrangement is such as to minimize the stess placed on the helical cutting blades by assuring that the cutting action between the blade and any one of the cutter bars 84 is distributed in such a fashion that only a minimum number of cuts are made at any one instance of time. This action reduces the stress on the cutter bars and also reduces the power requirements for driving the cutter bars within the chopper assembly.

Figure 6:
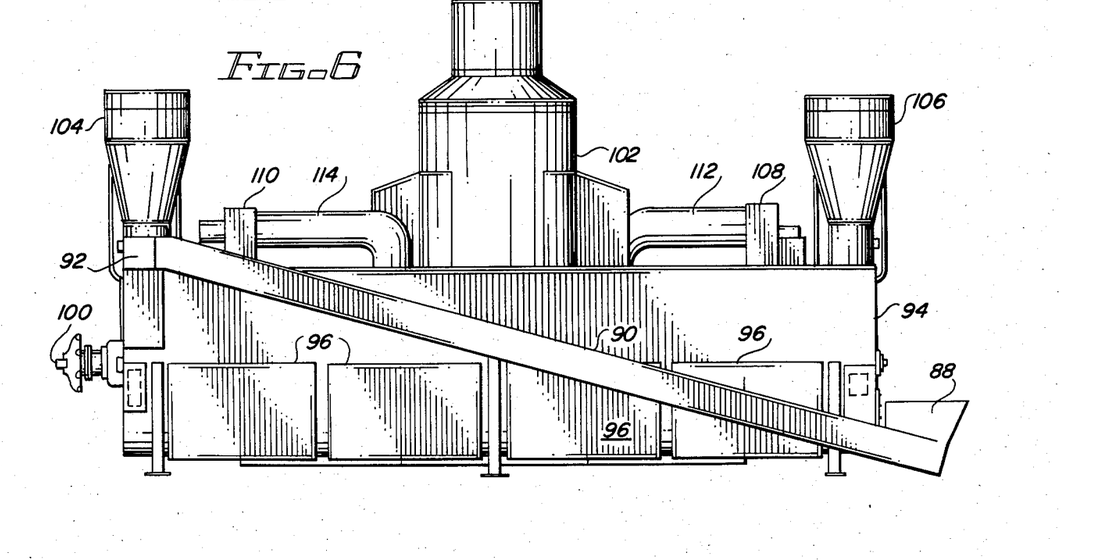
FIG. 6 is a side view of a mixer dryer assembly forming a portion of the present invention.

Referring now to FIG. 6, there is shown a side elevation view of a mixer dryer assembly 86 forming a further portion of the apparatus of the present invention. As will be appreciated, the comminuted aquatic plant material from chopper assembly 64 still contains a significant amount of moisture and is therefore difficult and heavy to handle. The apparatus illustrated in FIG. 6 is intended to extract the moisture from the comminuted plants and also includes the capability of mixing other materials with the plants in the event that the final product of the drying process is to be an animal feed. The comminuted plants are pumped by the screw pump 78 to a liquid extraction press (not shown) of a type well known in the art. A preferred press is the model PC press available from Liquid Extraction Systems, Inc. of Ormond Beach, Florida. It should be noted that use of a press is optional to the disclosed process. The advantage is in reducing drying time by extracting a substantial portion of the water in the material. After passing through the press, the plant material is transferred to a hopper 88 located at one end of an elevating conveyor 90. The elevating conveyor 90 is similar to the elevating conveyor 62 in that it is a continuous loop belt type conveyor of a type well known in the art. At an upper end 92 of the conveyor 90, the comminuted material is directed into a vat 94 forming the major portion of the apparatus 86. Located within the vat 94 are of plurality of rotating arms fashioned in the form of an interruped screw type conveyor. On the outside surface of the vat 94, there are located a plurality of water jackets 96 interconnected by piping arrangements 98. During operation of the mixer dryer assembly, heated water is pumped through the water jackets 96 to thereby control the temperature within the vat 94. The mixing blades located inside the vat 94 are mounted on a large shaft extending lengthwise to the vat 94 which is driven by a hydraulic motor 100 fixed to one end of the vat 94.

In order to improve the drying process, an air circulating arrangement is affixed atop the vat 94. The air circulating arrangement includes an exhaust vent 102 containing an exhaust fan for pulling air from within the vat 94 and expelling it to the atmosphere. On opposite ends of the vat 94 are located air inlets 104 and 106. Each of the inlets 104 and 106 contains a temperature control mechanism preferably in the form of coiled tubing through which heated water may be passed. This arrangement allows the air pulled into vat 94 by the exhaust fan located in vent 102 to be temperature controlled. It should be noted that the arrangement thus far described permits that the inside of the vat to be maintained at a slight negative pressure with respect to atmospheric pressure. This arrangement assures that material adjacent an opening (other than vent 102) will be drawn inwardly of vat 94 rather than blown outward. In addition, the arrangement assists in permitting additional material to be added to the material in the vat without having the air pressure blow material towards an opening.

In addition to the air circulation generated by the exhaust fan int the exhaust vent 102, additional air flow is provided by circulating blowers 108 and 110 also arranged on top of the vat 94 and connected to respective air ducts 112 and 114. Each of these blowers 108 and 110 are designed to pull air from a point adjacent the exhaust vent 102 and return it to a point adjacent the respective air inlets 106 and 104. Since the air passing through the blowers 108 and 110 is merely circulated internally, these blowers have no effect on the air pressure within the vat 94.

Figure 7:
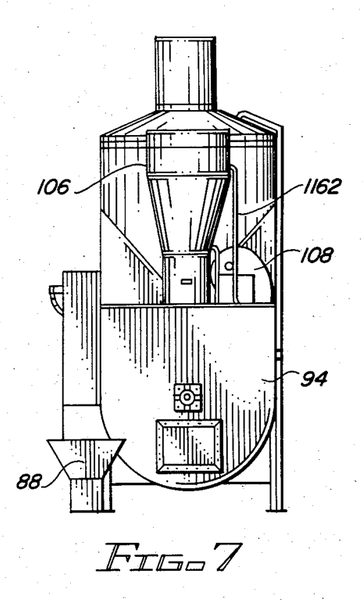
FIG. 7 is an end view of the mixer dryer assembly of FIG. 6.

Referring now to FIG. 7, there is shown an end view of the dryer assembly 86 illustrating the semi-cylindrical shape of the vat 94. FIG. 7 also illustrates the water lines 116 which carry the heated water to the inlets 104 and 106 to control the temperature of the air entering the vat 94.

Figure 8:
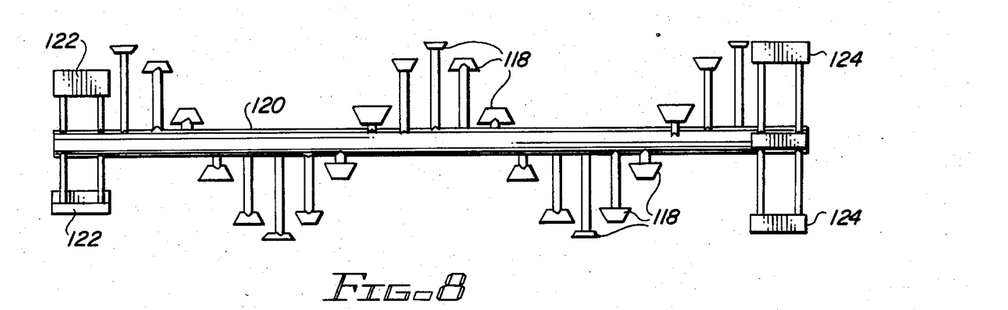
FIG. 8 is a top view of the mixer blade arrangement used in the mixer dryer assembly of FIG. 6.

Referring now to FIG. 8, there is shown an arrangement of mixer blades 118 on a shaft 120 in accordance with the present invention. As can be seen, the blades 118 are arranged to form an interrupted screw type conveyor which will move the material being mixed in the vat 94 from one end of the vat towards the other end. At each end of the shaft 120 are located two special blades 122 and 124 operating with double arms and serving merely to tumble the material at the end of the vat 94. The reason for affording the tumbling action at the end is that a takeoff point for extracting material from the vat is provided at each end. The blades 122 and 124 push the material past the takeoff points.

Figure 9:
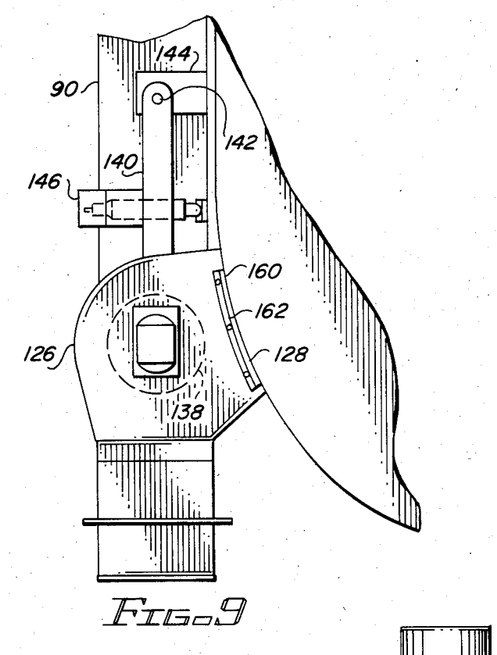
FIG. 9 is a partial view of an end of the assembly of FIG. 6 illustrating an apparatus for circulating material.

Referring now to FIG. 9, there is shown a partial elevation view of an end of the vat 94 illustrating the apparatus for extracting the material from the vat and for enabling it to be recirculated by dropping it onto the elevating conveyor 90. As was stated with respect to Figure 8, the comminuted plants are churned and gradually caused to migrate from one end of the vat 94 to another end by the action of the interrupted screw conveyor arrangement. At the end of the vat 94 adjacent the lowest section of the elevating conveyor 90 there is provided a housing assembly 126 attached to a side of the vat 94 adjacent an opening 128. Within the housing assembly 126 there is positioned a rotatable drum member 130 having a plurality of small protrusions on the surface thereof. The drum 138 is attached to a pivotable arm 140 which has a pivot point 142 at one end thereof. The pivot point passes through an extension 144 attached to the side of the vat 94. The arm 140 is adapted to be moved by a linear actuator 146 which may be a hydraulic operated piston assembly of a type well known in the art. By controlling the position of the arm 140 the drum 138 may be positioned into the opening 128 just sufficiently to grasp the plant material passing by the opening and causing it to be dumped into an opening atop the elevating conveyor 90.

Figure 10:
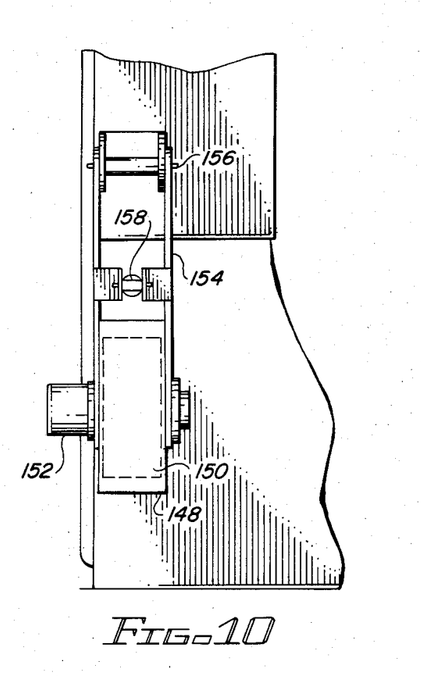
FIG. 10 is a partial view of the apparatus of FIG. 6 illustrating apparatus for extracting material.

Referring now to FIG. 10, there is shown a side view of the end of the vat 94 opposite the end shown in FIG. 9. At this end there is located a second housing 148 including another rotatable drum 150 of the type similar to that shown in FIG. 9. The drum 150 is driven in the same manner as the drum 138 by a motor 152. Since the drum 150 is used only to extract material from the vat 94 when it has become sufficiently dried to be useable, the drum 150 is also associated with a pivotable arm 154 attached to a pivot point 156 and operated by a linear actuator 158. If the material to be dried is extemely wet, several recirculations through the vat may be required. Accordingly, it may not be desirable to remove the material using the housing assembly 148 and drum 150 during the initial part of the cycle. In this instance, there is provided a door member which can be placed over the opening into the vat 94. In addition, a door member is provided to cover the opening on the end of the vat adjacent the housing 126. Since the latter door and operation are identical to that associated with housing 148, reference is again made to FIG. 9 in which there is shown an opening 160 formed in the housing 126 to allow a sliding door 162 to be positioned over the opening into the vat 94. The sliding door may be attached to the vat 94 by any means well known in the art.

Referring now to FIG. 11, there is shown a top view of vat 94 with the cover removed illustrate both the arrangement of the blades 118 and a plurality of dividers 164 which isolates each of the blades 118 above the top of the shaft 120 from each of the other blades 118. The purpose of the dividers 164 is to provide a flow of air across the top of the plant mixture to thereby improve the drying response time. For the present invention, it was found that a charge of plants which reached approximately the level of the shaft 120 can be dried within a few hours by using the illustrative arrangement. Increasing the charge level above the shaft 120 would require increase in the level of the bottom of the dividers 164 and would also significantly increase the required drying time.

An end view of the vat 94 is shown in FIG. 12 illustrating the positioning of the dividers 164. It will be appreciated that as the material inside the vat 94 is churned one side tends to rise higher than the other side. Accordingly, the dividers 164 are cut on a bias with one side being higher that the other side. Such an arrangement facilitates an air flow close to the surface of the plant material and generates turbulance to increase the absorption of moisture by the air.

In order to facilitate the understanding of the present invention, it will now be described in conjunction with a process for handling the embodied plants. As disclosed in Applicant's co-pending application serial number 533,102, the aquatic plants located on a body of water are forced into an area defined by a boom member which is attached to the connector pin 20 shown in FIG. 1. As this aquatic material is pulled into the area of the hitch feed finger assembly 22, it is forced forward into engagement with the rotating drum 26. The ribs running longitudinally of the kicker drum 26 engage the aquatic material causing it to move upward over the top of the drum where the serrated ribs 32 spirally wound about the feed drum 28 engage the material and force it into the passageway 30. The continued rotation of the feed drum 28 forces the material through the passageway 30 while spreading it evenly. Hog drum 38, using the teeth 46, grabs the plant material and rotates it under the cutter bar 40. At this point, the plant material is ripped and shredded into small sections and then deposited on the cross feed conveyor 44.

From the cross feet conveyor 44 the ripped and shredded material is conveyed to an elevating conveyor 62 shown in FIG. 4. The elevating conveyor 62 carries the material into a chopping assembly 64 which shreds the plant material into very small pieces and deposits it into an interrupted feed screw conveyor 78. The material is then transferred by the feed screw conveyor 78 to a liquid extraction press (not shown) which presses the material into a cake-like mass. The pressed material is then moved to the collecting hopper 88 located at the lower end of the elevating conveyor 90 attached to the side of the mixer dryer assembly 86. The material is conveyed by the conveyor 90 to a feed hopper 92 located adjacent one end of the vat 94 forming the major portion of the mixer dryer assembly 86. The material is dumped into the vat where a plurality of arms arranged in an interrupted feed screw arrangement gradually push the material from one end of the vat 94 to another end. During this process the material inside the vat is continually mixed and heated air is blown across its top surface. In addition, the vat itself is heated by hot water pumped through a plurality of water jackets 96 affixed to the side of the vat 94. If the material moved from one end of the vat 94 to a second end is not completely dry there is provided means for extracting that material from the vat and dropping onto the elevating conveyor 90 whereby it can be recirculated through the vat a further time. A similar type of takeoff arrangement is provided on another end of the vat for extracting the dried material therefrom.

While the harvester and chopper assemblies and mixer dryer assemblies of the present invention have been disclosed in a preferred embodiment, there will become apparent to those skilled in the art many modifications and arrangements without departing from the principles of the invention. It is intended therefore that the invention be limited only byt the scope of the appended claims.

We claim:

1. An apparatus for harvesting and processing aquatic plants comprising:
   a first drum adapted for positioning in a water reservoir containing aquatic plants, said first drum having a plurality of surface projections for engaging the plants and being rotatable in a direction to lift the plants over said first drum;
   a second drum having a plurality of spiral wound projections, said second drum being positioned above said first drum and being rotatable in a direction to engage and direct the plants on said first drum along a passageway;
   a third drum having a plurality of tooth-like projections, said third drum being positioned at an end of the passageway whereby plants directed along the passageway by said second drum are picked up by said toothlike projections on said third drum;

a cutter bar positioned against said third drum;

means for rotating said third drum whereby the plants are shredded by being driven into said cutter bar; and means for collecting the shredded plants.

2. The apparatus of claim 1 and including:
a chopper assembly comprising:
 (1) a chamber for receiving the plants;
 (2) a plurality of rotatable blades within said chamber; and
 (3) a re-cut screen cooperating with said blades for comminuting the plants; and
means for transporting the plants from said collecting means to said chopper assembly.

3. The apparatus of claim 2 and including:
means for receiving the comminuted plants;
means for drying the comminuted plants at a controlled rate, said drying means including:
 (1) means for stirring the plants; and
 (2) means for regulating air flow to the plants; and
means connected to said receiving means for transporting the comminuted plants to said drying means.

4. The apparatus of claim 1 and including:
means for directing the plants toward said first drum; and
means for pushing the plants into engagement with said first drum.

5. The apparatus of claim 1 wherein aid first drum comprises an elongated cylinder rotatable about a central axis and said surface projections comprise rib-like members attached to the outer surface of said cylinder and extending from end-to-end thereof.

6. The apparatus of claim 1 wherein said second drum comprises an elongated cylinder substantially co-extensive with said first drum and rotatable about a central axis, said central axis being parallel to an axis of rotation of said first drum.

7. The apparatus of claim 6 wherein each of said spiral wound projections comprise a flat, elongated metal strip having one edge attached to an outer surface of said cylinder and a second edge projecting outwardly of said cylinder, said second edge being serrated.

8. The apparatus of claim 7 wherein said spiral wound projections are arranged to uniformly distribute the plants into said passageway.

9. The apparatus of claim 8 wherein said passageway comprises a space concurrent with an arc of rotation of said second drum, said space being defined by a plate having an arc of curvature parallel to said second drum.

10. The apparatus of claim 9 wherein said plate terminates along a line parallel to said axis of rotation of said second drum and in a horizontal plane below a horizontal plane passing through said axis of rotation of said second drum.

11. The apparatus of claim 1 wherein said third drum comprises a elongated cylinder substantially coextensive with said second drum and rotatable about a central axis parallel to an axis of rotation of said second drum, said tooth-like projections being arranged such a way that only one of said tooth-like projections is in direct alignment with said cutter bar at any instant in time.

12. The apparatus of claim 1 wherein said collecting means comprises a cross-feed conveyor positioned to catch the plants passing through said cutter bar, said conveyor carrying the plants to a storage reservoir.

13. The apparatus of claim 2 wherein said transporting means comprises a continuous loop belt conveyor having one end thereof positioned wihtin said collecting means and a second end thereof positioned above said chopper assembly whereby the plants are conveyed from said collecting means to a position above said chopper assembly for dropping thereinto.

14. The apparatus of claim 2 wherein said recut screen comprises:
a curved plate member having a plurality of openings; and
a cutter blade associated with each of said openings, each of said cutter blades being attached to said plate member and having an edge protruding through a corresponding one of said openings.

15. The apparatus of claim 14 wherein said openings are arranged in a plurality of horizontal rows, said openings in any one row being offset by one opening dimension from said opening in adjacent rows.

16. The apparatus of claim 14 wherein said protruding edge is at least 1/16" into said chamber.

17. The apparatus of claim 3 wherein said transporting means comprises an endless belt conveyor.

18. The apparatus of claim 17 wherein said receiving means comprises a receptacle opening over a first end of said conveyor.

19. The apparatus of claim 3 wherein said drying means comprises:
a vat having a semi-cylindrical configuration;
a rotatable central shaft extending through said vat;
stirring means attached to said shaft;
drive means attached to said shaft for causing rotation thereof to effect stirring of the plants;
ventilation means attached to said vat for producing an air flow over the plants; and
means for controlling the temperature of the air.

20. The apparatus of claim 19 wherein said vat includes temperature control means for controlling the temperatures of a surface of said vat.

21. The apparatus of claim 20 wherein said temperature control means comprises a water jacket attached to said vat and means for pumping heated water through said jacket.

22. The apparatus of claim 19 wherein said stirring means comprises a plurality of arms having one end thereof attached to said shaft, said arms being arranged along said shaft to form an interrupted helical scre drive whereby the plants are continuously churned toward a first end of said vat.

23. The apparatus of claim 19 wherein said vat includes:
a cover enclosing a top of said vat;
a plurality of baffles positioned transverse of said vat, an upper edge of each of said baffles abutting said cover, and a lower edge of each of said baffles being cut along a bias whereby the spacing between a top surface of the plants and the lower edge of each of said baffles varies transversely of said vat.

24. The apparatus of claim 23 wherein said ventilation means comprises:
an exhaust fan positioned over a vent located centrally of said cover whereby said exhaust fan pulls air from said vat to create a negative pressure therein with respect to atmospheric pressure;

first and second air intake vents, each of said intake vents located at a respective end of said vat; and.

25. The apparatus of claim 24 wherein each of said air intake vents includes a heat exchanger for controlling the temperature of the incoming air.

26. The apparatus of claim 25 wherein said heat exchanger comprises a water to air heat exchanger having coiled tubing intersecting the air flow and means for suppling heated water to said tubing.

27. The apparatus of claim 22 wherein said vat includes recirculating means for transferring the plants from said first end to a second end of said vat whereby the plants may be dried to a desired water content.

28. The apparatus of claim 27 wherein said recirculating means comprises:
   an endless belt conveyor positioned alongside said vat;
   an opening in a side of said vat adjacent said first end thereof;
   a fourth rotatable drum having a plurality of teeth projecting therefrom, said fourth drum positioned whereby said teeth protrude through said opening into said vat such that rotation of said fourth drum will pull the plants from said vat and deposit them on an end of said conveyor adjacent said opening; and
   means at an end of said conveyor adjacent said second end of said vat for returning the plants to said vat.

29. The apparatus of claim 19 and including means for removing dried plants from said vat, said removing means comprising:
   an opening in a side of said vat adjacent said second end;
   a fifth rotatable drum having a plurality of projecting teeth, said fifth drum being sized to fit within said opening;
   drive means for effecting rotation of said fifth drum;
   pivot means for attaching said fifth drum to said vat whereby said fifth can be selectively inserted into said opening for removing the comminuted plants.

* * * * *